(12) United States Patent
Viittala et al.

(10) Patent No.: US 8,751,127 B2
(45) Date of Patent: Jun. 10, 2014

(54) POSITION ESTIMATION SYSTEM AND METHOD

(75) Inventors: Harri Viittala, Oulu (FI); Simone Soderi, Florence (IT); Jani Saloranta, Oulu (FI); Matti Hämäläinen, Oulu (FI); Jari Iinatti, Oulu (FI)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/307,707

(22) Filed: Nov. 30, 2011

(65) Prior Publication Data

US 2013/0138314 A1     May 30, 2013

(51) Int. Cl.
*G06F 7/70*     (2006.01)

(52) U.S. Cl.
USPC .......................................................... 701/70

(58) Field of Classification Search
USPC .................................... 701/70, 445, 469, 470
See application file for complete search history.

(56) References Cited

U.S. PATENT DOCUMENTS

| | | | |
|---|---|---|---|
| 5,420,883 A | 5/1995 | Swensen et al. | |
| 6,366,234 B1 | 4/2002 | Katayama | |
| 6,693,562 B2 | 2/2004 | Rostren | |
| 7,725,252 B2 | 5/2010 | Heddebaut et al. | |
| 7,839,916 B1 * | 11/2010 | Luecke et al. | 375/147 |
| 2005/0192024 A1 * | 9/2005 | Sheynblat | 455/456.1 |
| 2006/0250234 A1 | 11/2006 | Maschke | |
| 2006/0287813 A1 * | 12/2006 | Quigley | 701/201 |
| 2006/0290499 A1 | 12/2006 | Chang | |
| 2007/0061041 A1 * | 3/2007 | Zweig | 700/245 |
| 2007/0142063 A1 | 6/2007 | Chiu et al. | |
| 2010/0063656 A1 * | 3/2010 | Knott et al. | 701/19 |
| 2010/0327125 A1 | 12/2010 | Braband et al. | |
| 2011/0184621 A1 | 7/2011 | Bock et al. | |

FOREIGN PATENT DOCUMENTS

| | | |
|---|---|---|
| DE | 4102812 A1 | 8/1992 |
| EP | 1707979 A2 | 10/2006 |
| GB | 2283873 A | 5/1995 |
| JP | 2001-204109 A | 7/2001 |
| JP | 2002-240719 A | 8/2002 |
| KR | 20020018771 A | 3/2002 |
| WO | WO2009068323 A1 | 6/2009 |

OTHER PUBLICATIONS

Gresham, Ian, et al., Ultra-Wideband Radar Sensors for Short-Range Vehicular Applications, IEEE Transactions on Microwave Theory and Techniques, vol. 52, No. 9, Sep. 2004, pp. 2105-2122, English language.

(Continued)

*Primary Examiner* — Muhammad Shafi
*Assistant Examiner* — Michael D Lang
(74) *Attorney, Agent, or Firm* — GE Global Patent Operation; John A. Kramer (57) ABSTRACT

There is provided a vehicle with the capability of estimating its position. An exemplary vehicle comprises a positioning unit configured to operate in a first mode for communicating with one or more first radio-responsive devices and operate in a second mode for communicating with one or more second radio responsive devices. The positioning unit is configured to estimate a coarse position of the vehicle based on data received from the first transceiver, and estimate a fine position of the vehicle based on data received from the second transceiver.

23 Claims, 4 Drawing Sheets

(56) References Cited

OTHER PUBLICATIONS

Mirabade, et al., Application of Sensor Fusion to Railway Systems, Proceedings of the 1996 IEEE/SICE/RSJ International Conference on Multisensor Fusion and Integration for Intelligent Systems, ID 0-7803-3700-X/96, 1996, pp. 185-192, English language.

Search Report and Written Opinion from corresponding PCT Application No. PCT/US2012/064021 dated Mar. 1, 2013.

* cited by examiner

POSITION ESTIMATION SYSTEM AND METHOD

BACKGROUND

1. Field of Invention

Exemplary embodiments of the invention relate generally to a system and method for determining a position of a mobile unit. For example, embodiments relate to techniques for estimating a position of a railway vehicle in relation to a point of interest.

2. Discussion of Art

Conventional positioning of a moving vehicle may be based, for example, on speed and position measurements, Doppler effect, the Global Positioning System (GPS), or some combination of these. One common approach to estimating a vehicle position uses the Global Positioning System (GPS). However, GPS requires a line of sight between the receiver and the global navigation satellites. Furthermore, the accuracy provided by GPS for civilian use is limited. Another common system for determining vehicle position, referred to an inertial navigation system (INS), makes use of a gyroscope and accelerometer. One advantage of an INS is that there is no need for line of sight to an external device. However, inertial systems have unbounded position error that increases slowly with time, which means decreasing accuracy.

Other common systems for determining vehicle position include the use of speed and position measurements taken using a tachometer. Position estimates can also be achieved by transmitting measurement signals using transponders or track circuits. However, such techniques present various obstacles to obtaining accurate position estimates for a high-speed vehicle. For example, track circuit methods can only achieve accuracy equal to a length of a track block. In tachometer-based systems, position errors occur caused by slipping of the vehicle wheals. Position measurement errors may be corrected by using GPS signal. However, in many applications, including railway applications, line of sight may not always be available.

BRIEF DESCRIPTION

Briefly, in accordance with an example embodiment of the invention, there is provided a vehicle with a positioning unit configured to operate in a first mode for communicating with one or more first radio-responsive devices and operate in a second mode for communicating with one or more second radio responsive devices. The positioning unit is configured to estimate a coarse position of the vehicle based on data received while operating in the first mode, and estimate a fine position of the vehicle based on data received while operating in the second mode.

In accordance with another example embodiment of the invention, there is provided a system for estimating position that includes a first set of stationary radio-responsive devices disposed relative to a point of interest and a second set of stationary radio-responsive devices disposed relative to the point of interest. The system also includes a vehicle with a positioning unit configured to operate in a first mode for communicating with the first set of radio-responsive devices and operate in a second mode for communicating with the second set radio responsive devices. The positioning unit is configured to estimate a coarse position of the vehicle based on data received while operating in the first mode, and estimate a fine position of the vehicle based on data received while operating in the second mode.

In accordance with another example embodiment of the invention, there is provided a method of estimating position. The method includes, within a first area of interest, communicating with one or more first radio responsive devices to estimate a coarse position. The method also includes, within a second area of interest, communicating with one or more second radio-responsive devices to estimate a fine position.

DRAWINGS

These and other features, aspects, and advantages of embodiments of the invention will become better understood when the following detailed description is read with reference to the accompanying drawings in which like characters represent like parts throughout the drawings, wherein.

DETAILED DESCRIPTION

Exemplary embodiments of the invention relate to a two-stage positioning technique. In accordance with an exemplary positioning system, a coarse position estimate may be computed within a coarse area of interest, and a fine position estimate may be is computed within a fine area of interest. Within the coarse area of interest, a mobile positioning unit may use a narrow band communication technique to estimate the coarse position of the mobile positioning unit. Within the fine area of interest, the positioning unit may use a wide band communication technique to estimate the fine position of the positioning unit. In embodiments, the fine positioning within the fine area of interest may be computed using both narrow band and wide band communications to obtain a more accurate estimate of the positioning unit compared to using narrow band communications alone. In embodiments, the positioning unit may be disposed within a vehicle such as a railway vehicle. The positioning unit may be used to control a braking system of the vehicle to stop the movement of the vehicle at a point of interest with sub-meter accuracy.

Figure 1:
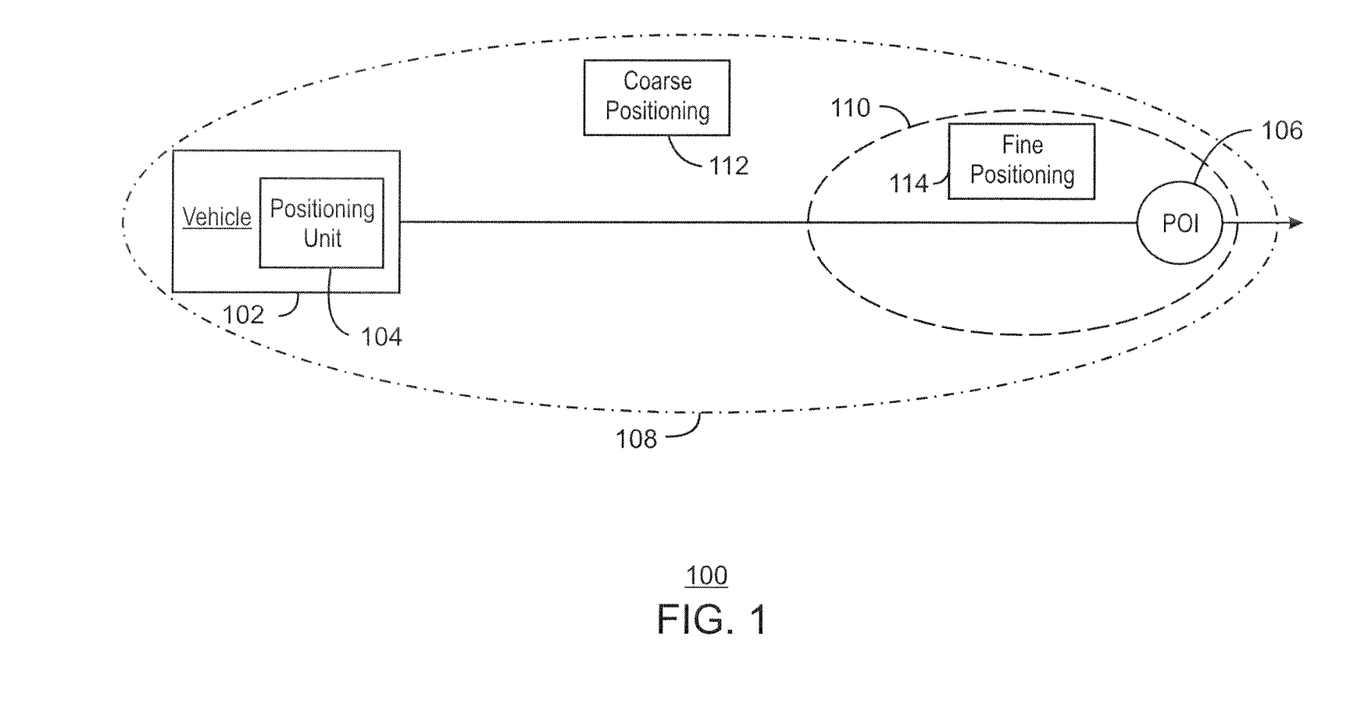
FIG. 1 is a block diagram of a positioning system, according to an exemplary embodiment of the invention.

FIG. 1 is a block diagram of a positioning system, according to an exemplary embodiment of the invention. As shown in FIG. 1, the positioning system 100 may include a vehicle 102 equipped with a positioning unit 104. The vehicle 102 may include a rail-way vehicle such as a locomotive, an automobile, a marine vessel, or any other suitable type of vehicle. Further, it will be appreciated that embodiments are not limited to determining the position of a vehicle. For example, the positioning unit 104 may be disposed within other types of mobile devices, such as mobile phones, for example.

The positioning unit 104 may be configured to estimate the position of the vehicle 102 in relation to a point of interest 106. The point of interest 106 may be a geographical location that is relevant in some way to the vehicle 102. For example, the point of interest 106 may coincide with the location of a loading dock or a passenger platform. The area within the vicinity of the point of interest 106 may be divided into a coarse area of interest 108 and a fine area of interest 110. The coarse area of interest 108 defines an area within which the positioning unit 104 will compute an estimated coarse position of the vehicle 102. The fine area of interest 110 defines an area within which the positioning unit 104 will compute an estimated fine position vehicle 102.

To determine the position of the vehicle 102, the positioning unit 104 may communicate with radio responsive devices disposed in the vicinity of the point of interest 106. As used herein, the term radio responsive device may be used to refer to active reflectors, passive reflectors, and wireless communication devices. An active reflector refers to a radio communication device that can receive, generate, and transmit radio signals using, for example, analog circuits. Examples of active reflectors include transponders, repeaters, and the like. A passive reflector refers to a radio reflective device such as a piece of metal. A wireless communication device refers to communication devices that can receive digital signals, process the data contained in the signals, and generate and transmit new digital signals that contain additional data. Examples of wireless communication devices include wireless routers, and the like. As used herein, the term "communicate" and variations thereof are used in relation to active reflectors, passive reflectors, and wireless communication devices. In other words, "communicating" with a radio responsive device includes sending an outbound signal to the radio responsive device and receiving a corresponding inbound signal from the radio responsive device, regardless of whether the inbound signal is generated by an active reflector or wireless communication device, or reflected from a passive reflector.

FIG. 1 shows two radio responsive devices referred herein as a coarse positioning device 112 and a fine positioning device 114. Both the coarse positioning device 112 and the fine positioning device 114 may be disposed at fixed positions about the point of interest 106. The positions of the devices 112 and 114 are known values. For example, coordinates describing the positions of the devices 112 and 114 in relation to the point of interest 106 may be stored to the positioning unit 104, programmed into the logic of the positioning unit 104, or otherwise accessible by positioning unit 104. To compute an estimated position of the vehicle 102, the positioning unit 104 determines a position of the vehicle 102 in relation to either the coarse positioning device 112 or the fine positioning device 114 or both. The position of the vehicle 102 in relation to the point of interest 106 can then be determined based on the known position of the coarse positioning device 112 or the fine positioning device 114 in relation to the point of interest 106.

In embodiments, the positioning unit 104 determines the position of the vehicle 102 by determining a distance between the vehicle 102 and the radio responsive devices. For example, the positioning unit 104 may transmit an outgoing signal from the vehicle 102 to one of the radio responsive devices, receive a return signal from one of the radio responsive devices, and compute a time-of-flight of the signals. The time-of-flight refers to an amount of time elapsed between the transmission of the outbound signal and the receipt of the inbound signal. The time-of-flight can be used to compute a distance measurement. In embodiments wherein the vehicle 102 is a railway vehicle, the path of the railway may provide another set of data that can be used to determine the position of the vehicle 102 based on the distance measurement. In this way, a single distance measurement may be used to determine the position of the vehicle 102. Data describing the path of the railway may be stored to the positioning unit 104, programmed into the logic of the positioning unit 104, or otherwise accessible by positioning unit 104. As described below in relation to FIG. 2, the position of the vehicle 102 may also be computed using two or more distance measurements based on signals received from two or more radio responsive devices.

As noted above, the positioning unit 104 computes a coarse position within the coarse are of interest 108 and a fine position within a fine area of interest 110. The coarse position is computed based on communications with the coarse positioning device 112, which may be an active or passive reflector or a wireless communication device. To compute the coarse position, the positioning unit 104 communicates with the coarse positioning device 112 using a narrow-band signal. For example, the bandwidth of the narrow-band signal may be approximately 5 to 40 Megahertz. The extent of the coarse area of interest 108 corresponds to the distance at which signals can be communicated between the positioning unit 104 and the coarse positioning device 112.

The fine position is computed based on communications with the fine positioning device 114, which may be an active or passive reflectors or a wireless communication device. To compute the fine position, the positioning unit 104 communicates with the fine positioning device 114 using a wide-band signal that has a bandwidth greater than the narrow-band signal that is used to communicate with coarse positioning device 112. For example, the bandwidth of the wide-band signal may be approximately 500 Megahertz to 2 Gigahertz. The extent of the fine area of interest 108 corresponds to the distance at which signals can be communicated between the positioning unit 104 and the fine positioning device 112.

As indicated by the extent of the coarse area of interest 108, the narrow-band signal used during coarse positioning enables a greater communication range compared to the wide-band signal. For example, the coarse area of interest 108 may extend approximately 1 kilometer around the coarse positioning device 112, whereas the fine area of interest 110 may extend approximately 50 meters around the fine positioning device 114. However, the wide-band signal used during fine positioning enables the computation of a more precise vehicle position compared to the narrow-band signal. For example, the use of the wide-band signal may enable the computation of position estimates with a precision of less than a meter, whereas the narrow-band signal may enable the computation of position estimates with a precision of a few meters.

In embodiments, the coarse positioning device 112 is a wireless communication device that communicates with the positioning unit 104 using an IEEE 802.11 standard protocol, such as WiFi. The positioning unit 104 may periodically transmit outbound signals to be received by the coarse positioning device 112 in an attempt to establish a communication link with the coarse positioning device 112. When the vehicle 102 is within the coarse area of interest 108, the outbound signals can be received by the coarse positioning device 112. In response to the outbound signal, the coarse positioning device 112 may generate and transmit a corresponding inbound signal back to the positioning unit 104 at the same frequency as the outbound signal. The inbound signal may transmit one or more data packets to the positioning device 112. Each inbound data packet may include an identifier that identifies the particular coarse positioning device 112 sending the data packet. The positioning unit 104 may then compute a coarse estimate of the vehicle position based on the round-trip time-of-flight of the outbound and inbound signals. The positioning unit 104 may continue to periodically send outbound signals to the coarse positioning device 112 in order to periodically re-compute the vehicle position as the vehicle 102 moves through the coarse area of interest 108. Additionally, when the vehicle 102 enters the coarse area of interest 108, the positioning unit 104 may begin periodically transmitting outbound signals to be received by the fine positioning device 114 in an attempt to establish communications with the fine positioning device 114.

The positioning unit 104 may communicate with the fine positioning device 114 by transmitting Ultra-wideband (UWB) pulses to the fine positioning device 114. In embodiments, the fine positioning device 114 is a passive reflector, which reflects the outbound pulses back to the positioning unit 104. In embodiments, the fine positioning device 114 is an active reflector, which, in response to receiving the outbound pulses, generates and transmits a corresponding inbound signal back to the positioning unit 104 at the same frequency as the outbound signal. In embodiments, the signal generated by the active reflector may be amplitude modulated or phase modulated the create a unique signature that identifies the fine positioning device 114 generating the signal. In embodiments, the fine positioning device 114 is a wireless communication device that communicates with the positioning unit 104 using an standard UWB protocol, such as ISO/IEC 26907 and IEEE 802.15.4a, among others. The inbound UWB signals generated by the fine positioning device 114 may include one or more data packets, each of which includes an identifier that identifies the particular fine positioning device 114 sending the data packet.

The vehicle 102 is within the fine area of interest 110 when the inbound signals generated or reflected by the fine positioning device 114 can be detected by the positioning unit 102. Upon the receipt of the inbound signals, e.g., UWB pulses, the positioning unit 104 can compute a fine estimate of the vehicle position based on the round-trip time-of-flight of the outbound and inbound signals. The positioning unit 104 may continue to periodically send outbound signals to the fine positioning device 114 in order to periodically re-compute the vehicle position as the vehicle 102 moves through the fine area of interest 110. As described further below in reference to FIG. 2, an exemplary positioning system may include any suitable number of coarse positioning devices 112 and any suitable number of fine positioning devices 114.

Figure 2:
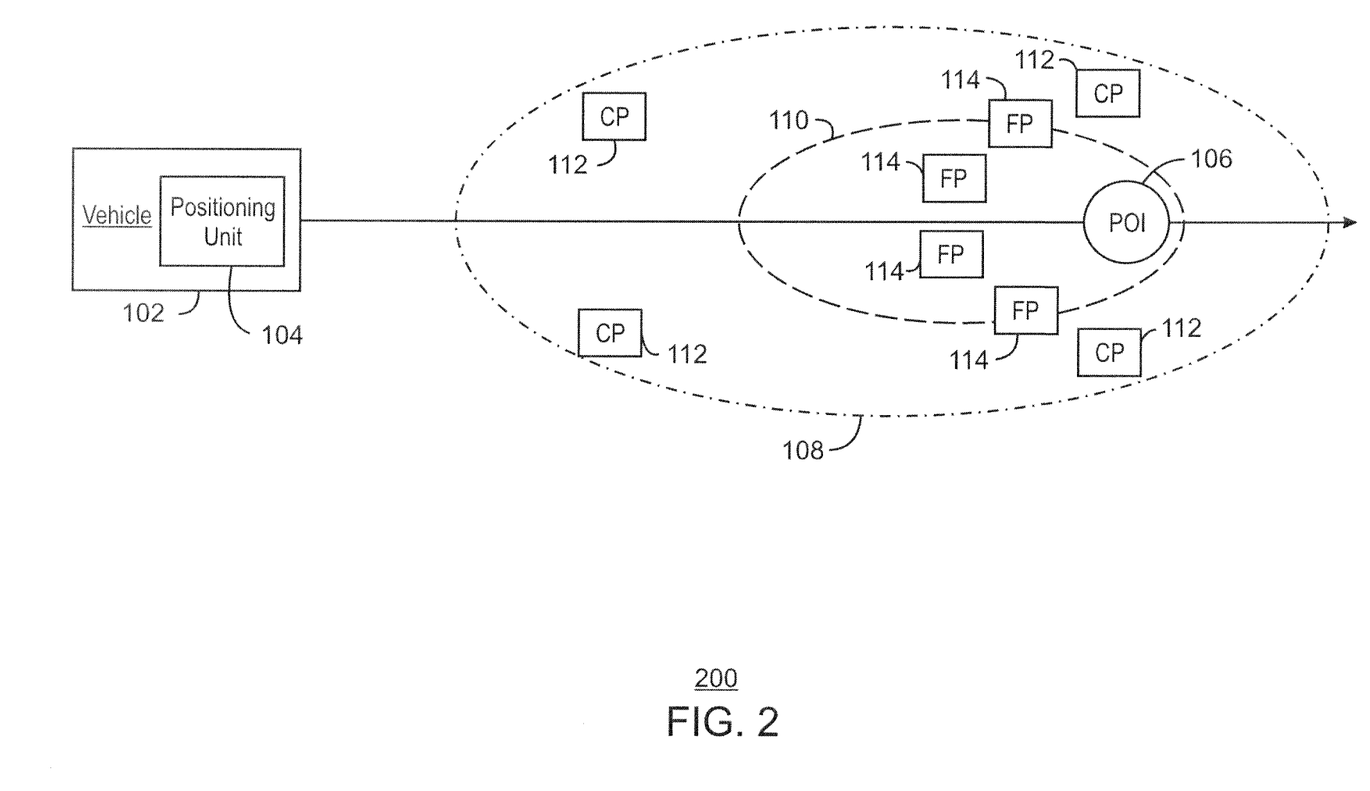
FIG. 2 is a block diagram of a positioning system, according to an exemplary embodiment of the invention.

FIG. 2 is a block diagram of a positioning system, according to an exemplary embodiment of the invention. As in the positioning system 100 described in reference to FIG. 1, the positioning system 200 may include a vehicle 102 equipped with a positioning unit 104 that computes an estimate of the vehicle position based on communications with a number of radio responsive devices disposed at fixed positions about a point of interest 106. The exemplary positioning system 200 shown in of FIG. 2 includes a set of four coarse positioning devices 112 and a set of four fine positioning devices 114. Other exemplary embodiments of a positioning system may include one, two, three, five, or more coarse positioning devices 112 and one, two, three, five, or more fine positioning devices 114. As used herein, the term "set" as in the phrase "set of radio responsive devices" is used to refer to one or more. Furthermore, embodiments are not limited to positioning systems that include an equal number of coarse positioning devices 112 and fine positioning devices 114.

As described above in relation to FIG. 1, the positioning unit 104 may determine the position of the vehicle 102 by transmitting radio signals to the radio responsive devices, receiving return signals from the radio responsive devices, measuring the time-of-flight, and computing a corresponding distance based on the time-of-flight measurements. In the embodiment shown in FIG. 2, the positioning unit 104 may compute a plurality of distance measurements for each level of positioning. For example, a distance measurement may be computed for each of the coarse positioning devices 112 and each of the fine positioning devices 114. The plurality of distance measurements can be used to compute a more precise position of the vehicle, for example, using trilateration. To trilateration, each distance measurement corresponds with the radius of a circle centered at the corresponding radio responsive device from which the signal was received. The intersection of the circles provides the vehicle location. Three signals may be used to determine a specific point in two-dimensional space. Four signals may be used to determine a specific point in three dimensional space.

As an example, when the vehicle 102 is within the coarse area of interest 108, the outbound signals sent by the positioning unit 104 can be received by each of the coarse positioning devices 112. In an embodiment wherein the coarse positioning devices 112 are wireless communication devices, the coarse positioning devices 112 may generate and transmit a corresponding inbound signal back to the positioning unit 104 upon receiving the outbound signal from the positioning unit 104. To enable the positioning unit 104 to associate each inbound signal with the proper coarse positioning device 112, each coarse positioning device 112 may add a unique identifier to the return signal that it generates, as described above. The positioning unit 104 may then compute the distance between the vehicle 102 and each of the coarse positioning devices 112, based on the round-trip time-of-flight of the outbound signal and the plurality of inbound, signals. The coarse estimate of the vehicle position may then be computed based, for example, on trilateration of the computed distances.

In a similar fashion, the fine estimate of the vehicle position may be computed using the signals received from the plurality of fine positioning devices 114. In embodiments wherein each of the fine positioning devices is an active reflector, each fine positioning device 114 may use a different level of amplitude modulate or phase modulate for the signal that it generates, which enables the positioning unit 104 to associate each inbound signal with the proper fine positioning device 114.

Figure 3:
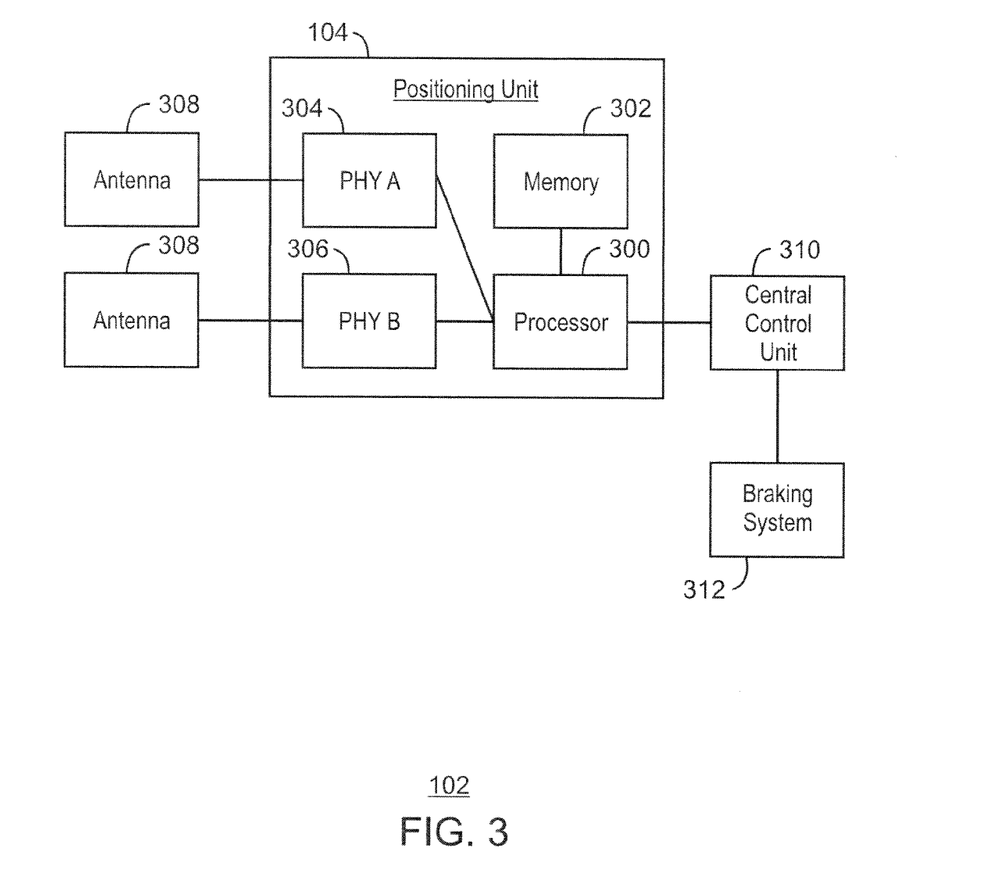
FIG. 3 is a block diagram of a vehicle that includes a positioning unit, in accordance with exemplary embodiments of the invention.

FIG. 3 is block diagram of a vehicle that includes a positioning unit, in accordance with exemplary embodiments of the invention. As shown in FIG. 3, the positioning unit 104 may include a processor 300 and a memory 302 comprising a non-transitory, computer-readable medium. The memory 302 may include volatile memory such as Random Access Memory (RAM) used during the execution of various operating programs, including operating programs used in embodiments of the present invention. The memory 302 can also include a storage system for the long-term storage of operating programs and data, including the operating programs and data used in embodiments of the present invention. For example, the memory 302 can include a hard disk drive, an optical drive, a universal serial bus (USB) drive, solid state memory, and the like. In embodiments, the processor 300 and the memory 302 may be implemented as an Application Specific, Integrated Circuit (ASIC). In embodiments, the positioning unit 104 may be implemented on a general-purpose computing device, for example, laptop computer, a smart phone, and the like.

The positioning unit 104 may include two physical layers or PHYs, referred to herein as PHY A 304 and PHY B 306. Each PHY 304 and 306 is communicatively coupled to the processor 300 and enables the positioning unit 104 to communicate with the radio responsive positioning devices 112 and 114 (FIGS. 1 and 2). As an example, PHY A 304 may be used to communicate with the coarse positioning devices 112 and PHY B 306 may be used to communicate with the fine positioning devices 114. Each of PHY A 304 and PHY B 306 may include one or more transceivers, amplifiers, signal processors, and any other circuitry which may be used to enable the positioning unit 104 to transmit and receive radio signals. PHY A 304 and PHY B 306 may each be operatively coupled to a corresponding antenna 308, which may be disposed in or on the vehicle 102. In an embodiment, PHY A 304 and PHY B 306 may be coupled to the same antenna 308.

PHY A 304 may be used to acquire information used for computing a coarse estimate of the vehicle position while the vehicle 102 is in the coarse area of interest 108. PHY B 306 may be used to acquire information used for computing a fine estimate of the vehicle position while the vehicle 102 is in the fine area of interest 110. In an embodiment, PHY A 304 communicates with the coarse positioning devices 112 using a first bandwidth, and PHY B 306 communicates with the fine positioning devices 114 using a second bandwidth larger than the first bandwidth. For example, the first bandwidth may be approximately 5 to 40 Megahertz and the second bandwidth may approximately 500 Megahertz to 2 Gigahertz. Further, PHY A 304 may communicate with the coarse positioning devices 112 using an IEEE 802.11 protocol such as WiFi. PRY B 306 may communicate with the fine positioning devices 114 by transmitting Ultra-Wideband (UWB) pulses and receiving corresponding echoes from the fine positioning devices 114.

In embodiments, the positioning unit 104 may be communicatively coupled to a central control unit 310 of the vehicle 102. The position estimates computed by the positioning unit 104 may be output to the central control unit 310. The central control unit 310 may use the position estimate for a variety of purposes. In an embodiment, the position estimate may be communicated to a person such as a vehicle operator through a user interface. In an embodiment, the central control unit 310 may be operatively coupled to a braking system of the vehicle 102. In such embodiments, the central control unit 310 may compute a braking signal based, at least in part, on the position estimate received from the positioning unit 104. The braking signal may determine a degree of braking to be applied to the vehicle 102 may be computed based, for example, on the speed of the vehicle 102 and the distance of the vehicle 102 from the point of interest 106. The braking signal may be sent from the central control unit 310 to the braking system 312 to engage the brakes of the vehicle 102 until the vehicle 102 is stopped at the point of interest 106. Within the coarse area of interest 108, the braking signal may be based on the coarse position estimate provided by the positioning unit 104. Within the fine area of interest 110, the braking signal may be based on the fine position estimate provided by the positioning unit 104.

Further, the positioning unit 104 may be configured to automatically switch between outputting a coarse position estimate and outputting a fine position estimate based, at least in part, on whether the vehicle 102 is within the coarse area of interest 108 or the fine area of interest 110. For example, when the positioning unit 104 is able to establish communications through PHY B 306, the positioning unit 104 may automatically switch from outputting a coarse position estimate to outputting a fine position estimate. In some embodiments, when the vehicle 102 is within the fine area of interest 110, the positioning unit 104 may compute both a fine position estimate and a coarse position estimate, in which case both PHY A 304 and PHY B 306 may be operating simultaneously to obtain information for computing the vehicle position. In other embodiments, when the vehicle 102 is within the fine area of interest 110, the positioning unit 104 may compute only a fine position estimate, in which case only PHY A 304 may be operating.

Figure 4:
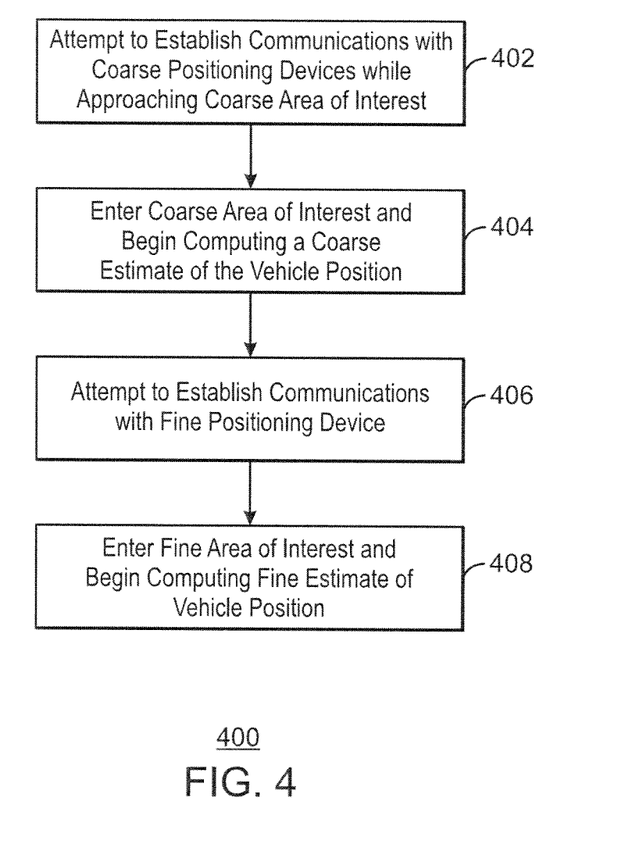
FIG. 4 is a method of determining a position, in accordance with exemplary embodiments of the invention.

FIG. 4 is a block diagram of a method of determining a position, in accordance with exemplary embodiments of the invention. The method 400 may be performed by the positioning unit 104 and is described herein with reference also to FIGS. 1-3. The method 400 may begin at block 402, wherein the vehicle 102 is approaching the coarse area of interest 108. During this time, the vehicle 102 continues to attempt to establish communications with the set of coarse positioning devices 112 even though the vehicle 102 may be outside the radio range of the coarse positioning devices 112. Upon entering the coarse area of interest 108, the process flow may advance to block 404.

At block 404, the positioning unit establishes communications with one or more of the coarse positioning devices 112. This indicates that the vehicle 102 is within the coarse area of interest 108. Based on the information received from the coarse positioning devices 112, the coarse estimate of the vehicle position may be computed as described above. For example, the vehicle position may be determined by measuring the time-of-flight of the signals sent to and received from the coarse positioning devices 112. The position of the vehicle 102 may be tracked as the vehicle 102 moves through the coarse area of interest 108 by periodically transmitting signals to and receiving signals from the coarse positioning devices 112. As described in relation to FIG. 3, communications with the coarse positioning devices 112 may be accomplished using a dedicated physical layer, for example, PHY A 304, which uses a narrow-band signal.

While tracking the position of the vehicle 102 through the coarse area of interest, the positioning unit 104 may output the coarse estimate of the vehicle position to the central control unit 310. The central control unit 310 may begin engaging the braking system 312 of the vehicle 102 based on the coarse position of the vehicle as described above.

At block 406, after entering the coarse area of interest, the positioning unit 104 may also begin attempting to communicate with the fine positioning devices 114. Upon entering the fine area of interest 110, the process flow may advance to block 408.

At block 408, the positioning unit 104 establishes communications with one or more of the fine positioning devices 114, which indicates that the vehicle 102 is within the fine area of interest 110. For example, the positioning unit 104 may detect echoes reflected from the fine positioning devices 114 or receive data packets generated by the fine positioning devices 114. When the positioning unit 104 is able to detect the signals transmitted by or reflected from the fine positioning devices 114, the fine estimate of the vehicle position may be computed as described above. For example, the vehicle position may be determined by measuring the time-of-flight of the signals sent to and received from the fine positioning devices 114. The position of the vehicle 102 may be tracked as the vehicle 102 moves through the fine area of interest 110 by periodically transmitting signals to and receiving signals from the fine positioning devices 114. As described in relation to FIG. 3, communications with the fine positioning devices 112 may be accomplished using a dedicated physical layer, for example, PHY B 306, which uses Ultra-wideband pulses.

While tracking the position of the vehicle 102 through the fine area of interest 110, the positioning unit 104 may output the fine estimate of the vehicle position to the central control unit 310. In embodiments, the positioning unit 104 may automatically stop outputting a coarse position estimate and begin outputting a fine position estimate upon entering the fine area of interest 106. In embodiments, the positioning unit may output both a coarse position estimate and a fine position estimate. Within the fine area of interest 110, the engagement of the braking system 312 of the vehicle 102 may be based on the fine position estimate as described above. Eventually, the central control unit 310 may cause the vehicle 102 to stop within the vicinity of the point of interest 106, for example, within 1 meter of the point of interest 106.

When the vehicle 102 starts moving away from the point of interest 106, the process flow described above may be performed in the reverse order. In other words, a fine position estimate may be computed while the vehicle 102 is in the fine area of interest 110 until the signals from the fine positioning devices 114 can no longer be detected. Once the vehicle 102 leaves the fine area of interest, the positioning unit may automatically switch to computing a coarse position estimate. The positioning unit 104 may track the vehicle position through the coarse area of interest 108 until the positioning unit 104 is out of radio range of the coarse positioning devices 112.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. The dimensions, values, and types of materials described herein are intended to illustrate embodiments of the invention, but are by no means and are exemplary in nature. Other embodiments may be apparent upon reviewing the above description. The scope of the invention, therefore, should be determined with reference to the appended claims, alone: with the fall scope of equivalents to which such claims are entitled.

In the appended claims, any usage of the terms "including" and "in which" are indicated the plain-English equivalents of the respective terms "comprising" and "wherein." Moreover, in the following claims, the terms "first," "second," "third," "upper," "lower," "bottom," "top," "up," "down," etc, are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

As used herein, an element or step recited in the singular and proceeded with the word "a" or "an" should be understood as not excluding plural of said elements or steps, unless such exclusion is explicitly stated. Furthermore, references to "one embodiment" of the invention are not to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Certain changes may be made in the above-described apparatus, without departing from the spirit and scope of the invention herein involved. Accordingly, it is intended that all of the subject matter of the above description or shown in the accompanying drawings shall be interpreted merely as examples illustrating the inventive concept herein and shall not be construed as limiting the invention.

The invention claimed is:

1. A vehicle, comprising:
a positioning unit configured to operate in a first mode for communicating with one or more first radio-responsive devices and operate in a second mode for communicating with one or more second radio-responsive devices;
wherein the positioning unit is configured to estimate a coarse position of the vehicle based on data received while operating in the first mode, and estimate a fine position of the vehicle based on data received while operating in the second mode; and
wherein the positioning unit is configured to estimate at least one of the fine position or the coarse position by transmitting an outbound signal to the one or more first radio-responsive devices or to the one or more second radio-responsive devices, respectively, receiving a return signal corresponding to the outbound signal from the one or more first radio-responsive devices or the one or more second radio-responsive devices, and measuring the time difference between the transmission of the outbound signal and the receiving of the return signal.

2. The vehicle of claim 1, wherein the positioning unit comprises:
a first transceiver for operating in the first mode, the first transceiver configured to communicate with the one or more first radio-responsive devices; and
a second transceiver for operating in the second mode, the second transceiver configured to communicate with the one or more second radio-responsive devices.

3. The vehicle of claim 1, wherein:
while in the first mode, the positioning unit communicates with the one or more first radio-responsive devices using a first signal with a first bandwidth; and
while in the second mode, the positioning unit communicates with the one or more second radio-responsive devices using a second signal with a second bandwidth larger than the first bandwidth.

4. The vehicle of claim 3, wherein the first bandwidth is approximately 5 to 40 Megahertz and the second bandwidth is approximately 500 Megahertz to 2 Gigahertz.

5. The vehicle of claim 1, wherein:
while in the first mode, the positioning unit communicates with the one or more first radio-responsive devices using an IEEE 802.11 protocol; and
while in the second mode, the positioning unit communicates with the one or more second radio-responsive devices using Ultra-Wideband (UWB) pulses.

6. The vehicle of claim 1, wherein:
the positioning unit is configured to operate in the first mode for communicating with the one or more first radio-responsive devices, said one or more first radio-responsive devices comprising a first set of stationary radio-responsive devices disposed relative to a point of interest, and wherein the positioning unit is configured to operate in the second mode for communicating with the one or more second radio-responsive devices, said one or more second radio-responsive devices comprising three or more reflectors disposed at known locations relative to the point of interest, said reflectors being at least one of active or passive reflectors; and
the positioning unit is configured to estimate the fine position based on the time difference between the transmission of the outbound signal and the receiving of the return signal reflected from at least one of three or more reflectors.

7. A vehicle comprising:
a positioning unit configured to operate in a first mode for communicating with one or more first radio-responsive devices and operate in a second mode for communicating with one or more second radio responsive devices, wherein the positioning unit is configured to estimate a coarse position of the vehicle based on data received while operating in the first mode, and estimate a fine position of the vehicle based on data received while operating in the second mode; and a control unit coupled to the positioning unit and a braking system configured to receive a braking control signal from a control unit, wherein:
within a coarse area of interest, the braking control signal is based on the coarse position of the vehicle; and
within a fine area of interest the braking control signal is based on the fine position of the vehicle.

8. A system for estimating position, comprising:
a first set of stationary radio-responsive devices disposed relative to a point of interest, the point of interest comprising a docking station, a re-fueling station, or a passenger platform;
a second set of stationary radio-responsive devices disposed relative to the point of interest; and
a vehicle comprising:
a positioning unit configured to operate in a first mode for communicating with the first set of radio-responsive devices and operate in a second mode for communicating with the second set of radio responsive devices;
wherein the positioning unit is configured to estimate a coarse position of the vehicle based on data received while operating in the first mode, and estimate a fine position of the vehicle based on data received while operating in the second mode, and wherein the positioning unit is configured to estimate at least one of the coarse position or the fine position based on a measured time-of-flight of signals sent to and received from the first set of radio-responsive devices or the second set of radio-responsive devices, respectively.

9. The system of claim 8, wherein the positioning unit comprises:
a first transceiver for operating in the first mode, the first transceiver configured to communicate with the first set of radio-responsive devices; and
a second transceiver for operating in the second mode, the second transceiver configured to communicate with the second set radio-responsive devices.

10. The system of claim 9, wherein the first transceiver communicates with the first set of radio-responsive devices using a first signal with a first bandwidth, the second transceiver communicates with the second set of radio-responsive devices using a second signal with a second bandwidth, and the second bandwidth is larger than the first bandwidth.

11. The system of claim 10, wherein the first bandwidth is approximately 5 to 40 Megahertz and the second bandwidth is approximately 500 Megahertz to 2 Gigahertz.

12. The system of claim 10, wherein the first transceiver is an IEEE 802.11 protocol transceiver and the second transceiver is an Ultra-Wideband (UWB) transceiver.

13. The system of claim 8, wherein each radio-responsive device in the first set of radio-responsive devices comprises a wireless communication device configured to receive an outbound signal transmitted from the positioning unit, generate a return signal, and transmit the return signal, wherein the outbound signal and the return signal comprise the signals for which the time-of-flight is measured.

14. The system of claim 13, wherein the positioning unit and the wireless communication device communicate using an IEEE 802.11 standard protocol.

15. The system of claim 8, wherein each radio-responsive device in the second set of radio-responsive devices is an active reflector.

16. A system for estimating position, comprising:
a first set of stationary radio-responsive devices disposed relative to a point of interest;
a second set of stationary radio-responsive devices disposed relative to the point of interest; and
a vehicle comprising:
a positioning unit configured to operate in a first mode for communicating with the first set of radio-responsive devices and operate in a second mode for communicating with the second set radio responsive devices;
wherein the positioning unit is configured to estimate a coarse position of the vehicle based on data received while operating in the first mode, and estimate a fine position of the vehicle based on data received while operating in the second mode;
wherein the second set of radio-responsive devices comprises three or more active reflectors disposed at known locations relative to the point of interest, and estimating the fine position comprises measuring a time-of-flight of signals sent to and reflected from the three or more active reflectors.

17. A method of estimating position, comprising:
within a first area of interest, communicating with one or more first radio responsive devices to estimate a coarse position;
within a second area of interest, communicating with one or more second radio-responsive devices to estimate a fine position; and
transmitting a braking signal to a braking system, wherein:
within the first area of interest, the braking signal is generated based on the coarse position; and
within the second area of interest, the braking signal is based on the fine position.

18. The method of claim 17, wherein communicating with one or more first radio-responsive devices comprises transmitting an outbound signal using an IEEE 802.11 protocol and receiving an inbound signal transmitted by the one or more first radio responsive devices using the IEEE 802.11 protocol.

19. The method of claim 17, wherein communicating with one or more second radio-responsive devices comprises transmitting Ultra-wideband (UWB) pulses and receiving corresponding echoes reflected from the one or more second radio-responsive devices.

20. The method of claim 17, wherein communicating with the first radio-responsive device uses a first bandwidth, and communicating with the second radio-responsive device uses a second bandwidth larger than the first bandwidth.

21. The method of claim 20, wherein the first bandwidth is approximately 5 to 40 Megahertz and the second bandwidth is approximately 500 Megahertz to 2 Gigahertz.

22. A positioning system, comprising:
a positioning unit configured to operate in a first mode for communicating with one or more first radio-responsive devices and operate in a second mode for communicating with one or more second radio-responsive devices;
wherein the positioning unit is configured to estimate a coarse position of a vehicle in which the positioning unit is disposed based on data received while operating in the first mode, and estimate a fine position of the vehicle based on data received while operating in the second mode, and wherein the positioning unit is configured to estimate at least one of the coarse position or the fine position based on a measured time-of-flight of signals sent to and received from the first radio-responsive devices or the second radio-responsive devices, respectively.

23. The positioning system of claim 22, wherein:

the positioning unit is configured to operate in the first mode for communicating with the one or more first radio-responsive devices, said one or more first radio-responsive devices comprising a first set of stationary radio-responsive devices disposed relative to a point of interest, and wherein the positioning unit is configured to operate in the second mode for communicating with the one or more second radio-responsive devices, said one or more second radio-responsive devices comprising three or more reflectors disposed at known locations relative to the point of interest, said reflectors being at least one of active or passive reflectors; and the positioning unit is configured to estimate the fine position based on the measured time-of-flight of the signals sent to and reflected from the three or more reflectors.

* * * * *